United States Patent
Fukazawa et al.

(10) Patent No.: US 11,854,151 B2
(45) Date of Patent: Dec. 26, 2023

(54) INFORMATION PROCESSING DEVICE, INFORMATION PROCESSING METHOD, AND RECORDING MEDIUM

(71) Applicant: SONY GROUP CORPORATION, Tokyo (JP)

(72) Inventors: Ryo Fukazawa, Kanagawa (JP); Hidenori Aoki, Chiba (JP); Fujio Arai, Tokyo (JP); Masayuki Inoue, Chiba (JP); Tomohiko Gotoh, Kanagawa (JP); Shintaro Tsutsui, Tokyo (JP); Keijiroh Nagano, Tokyo (JP); Haruka Fujisawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 45 days.

(21) Appl. No.: 17/629,951

(22) PCT Filed: Jul. 13, 2020

(86) PCT No.: PCT/JP2020/027195
§ 371 (c)(1),
(2) Date: Jan. 25, 2022

(87) PCT Pub. No.: WO2021/033456
PCT Pub. Date: Feb. 25, 2021

(65) Prior Publication Data
US 2022/0254111 A1    Aug. 11, 2022

(30) Foreign Application Priority Data
Aug. 19, 2019 (JP) .................................. 2019-149855

(51) Int. Cl.
*G06T 19/00* (2011.01)
*A63F 13/52* (2014.01)

(52) U.S. Cl.
CPC ............ *G06T 19/006* (2013.01); *A63F 13/52* (2014.09)

(58) Field of Classification Search
None
See application file for complete search history.

(56) References Cited

FOREIGN PATENT DOCUMENTS

JP    2012-181704 A    9/2012
JP    2015-526168 A    9/2015
(Continued)

OTHER PUBLICATIONS

Reitmayr et al. Location based Applications for Mobile Augmented Reality, Dec. 2003 Australian Computer Society, Inc. , 1-9. (Year: 2003).*

*Primary Examiner* — Robert J Craddock
(74) *Attorney, Agent, or Firm* — Paratus Law Group, PLLC

(57) ABSTRACT

This information processing device includes: a control device which determines whether or not a first terminal is in a first position in a real space, controls, on the basis of the determination that the first terminal is in the first position, the first terminal to start superimposing a virtual object according to the first position on the real space, determines whether or not the second terminal different from the first terminal is in the first position, and controls the second terminal to start superimposing the virtual object on the real space, on the basis of the determination that the second terminal is in the first position. The control device executes differently the start of a first operation of the virtual object by the first terminal and the start of a second operation of the virtual object by the second terminal, with respect to at least one among the display start timing and the display start position of the virtual object, and synchronizes the end of the first operation and the end of the second operation.

11 Claims, 7 Drawing Sheets

(56) References Cited

FOREIGN PATENT DOCUMENTS

| JP | 2017-091423 A | 5/2017 |
|----|---------------|--------|
| WO | WO 2011/058910 A1 | 5/2011 |

\* cited by examiner

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2020/027195 (filed on Jul. 13, 2020) under 35 U.S.C. § 371, which claims priority to Japanese Patent Application No. 2019-149855 (filed on Aug. 19, 2019), which are all hereby incorporated by reference in their entirety.

FIELD

The present disclosure relates to an information processing device, an information processing method, and a recording medium.

BACKGROUND

In a multiplayer game of video games and the like, a character moves with almost the same state transition as viewed from any user. Further, such video games and the like employ a method for changing a cut so as to switch to a movie scene in order to show a certain specific scene. The video games and the like further employ a method for forcibly disabling a user to input character control and automatically moving a rendering camera or a character to a place where the user is wanted to see.

Further, as a technique for controlling the movement of a character, for example, a technique for controlling the movement of a character displayed on the other party side in a case of making a conversation over a network is known.

CITATION LIST

Patent Literature

Patent Literature 1: JP 2012-181704 A

SUMMARY

Technical Problem

In a multiplayer game using an augmented reality (AR) technology, however, it is difficult for each user to experience a specific scene in the same manner. For example, in such a multiplayer game using the AR technology, a character that is a virtual object is superimposed on and displayed in a real space for a user wearing a head mounted display (HMD) or the like. In this case, a rendering range of the character or the like for the user is controlled in a manner that depends on the position and orientation of the user, so that it is difficult to employ a method for forcibly controlling a rendering camera. Further, it is difficult to capture a character or the like within the angle of view at all times due to a limitation on the viewing angle of the HMD and a difference in the way of movement among users.

For this reason, when a character is displayed using the AR technology or the like for the user wearing the HMD or the like, it is difficult to provide each user with a specific scene such as an animation necessary for the progress of the multiplayer game in the same manner.

Therefore, the present disclosure proposes an information processing device, an information processing method, and a recording medium that allow each user to experience a specific scene in the same manner even with a display device having a limited viewing angle.

Solution to Problem

According to the present disclosure, an information processing device includes a control device configured to determine whether a first mobile terminal is in a first position in a real space and control, based on determination that the first mobile terminal is in the first position, the first mobile terminal to start to superimpose a virtual object on the real space in response to the first position, and determine whether a second mobile terminal different from the first mobile terminal is in the first position and control, based on determination that the second mobile terminal is in the first position, the second mobile terminal to start to superimpose the virtual object on the real space, wherein the control device causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

DESCRIPTION OF EMBODIMENTS

Figure 1:
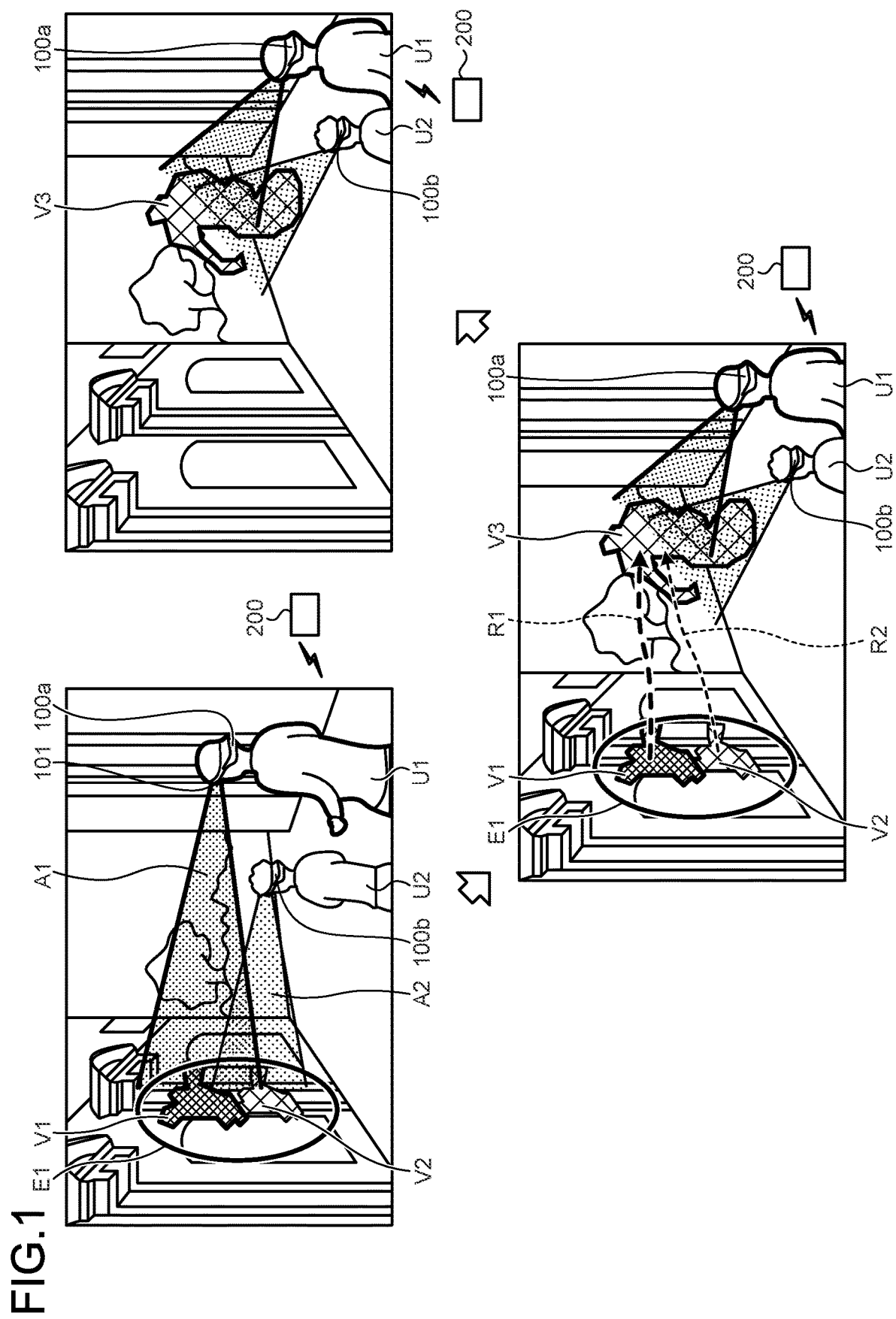
FIG. 1 is a diagram illustrating an example of information processing according to a first embodiment.

Hereinafter, embodiments of the present disclosure will be described in detail with reference to the drawings. Note that, in each of the following embodiments, the same components are denoted by the same reference numerals to avoid the description from being redundant.

The present disclosure will be described according to the following order of items.

1. First embodiment
   1-1. Example of information processing according to first embodiment
   1-2. Structure of system according to first embodiment
   1-3. Structure of mobile terminal according to first embodiment
   1-4. Structure of information processing device according to first embodiment 1-5. Information processing flow according to first embodiment
1-6. Effects
2. Second embodiment
2-1. Example of appearance range according to second embodiment
3. Third embodiment
3-1. Example of appearance range according to third embodiment
4. Modifications of embodiments
5. Hardware structure
6. Effects

1. First Embodiment

1-1. Example of Information Processing According to First Embodiment

FIG. 1 is a diagram illustrating an example of information processing according to the first embodiment. The information processing according to the first embodiment is performed by mobile terminals 100a, 100b and an information processing device 200 illustrated in FIG. 1.

The mobile terminals 100a, 100b are information processing terminals configured to provide a so-called AR technology or the like. According to the first embodiment, the mobile terminals 100a, 100b are wearable displays to be used with being worn on the heads of users U1, U2, respectively. More specifically, the mobile terminals 100a, 100b may be each referred to as an HMD, AR glasses, or the like. Further, in the following description, the mobile terminal 100a of the user U1 corresponds to a first mobile terminal, and the mobile terminal 100b of the user U2 corresponds to a second mobile terminal. Note that, when the mobile terminals 100a, 100b of the users U1, U2 are not distinguished, the mobile terminals 100a, 100b are each simply referred to as a mobile terminal 100.

The mobile terminal 100 includes a display 101 that is a transmissive display. For example, the mobile terminal 100 superimposes a virtual object represented by computer graphics (CG) or the like on a real space and displays, on the display 101, the virtual object superimposed on the real space. Note that, in the following description, the virtual object superimposed on the real space is also referred to as an AR object. Further, examples of the AR object include a character of a multiplayer game. In the example illustrated in FIG. 1, the mobile terminal 100a worn by the user U1 displays an AR object V1. Further, the mobile terminal 100b worn by the user U2 displays an AR object V2. The AR objects V1, V2 are displayed in a superimposed manner within an appearance range E1 set, for example, in the vicinity of a door in the real space. The mobile terminal 100 may have another element for use in outputting a predetermined output signal in addition to the display 101. For example, the mobile terminal 100 may include a speaker 102 or the like for use in outputting sound.

The information processing device 200 acquires position information from the mobile terminals 100a, 100b and makes a determination about the display of the AR objects V1, V2. The information processing device 200 transmits a display start trigger to each of the mobile terminals 100a, 100b based on a result of the determination.

The AR objects V1, V2 are placed, based on a detection result from a sensor 110 to be described later, in a global coordinate system associated with the real space. At this time, the AR object V1 is placed in a position within the appearance range E1 in a manner that depends on a position, orientation, and angle of view A1 of the user U1. Further, the AR object V2 is placed in a position within the appearance range E1 in a manner that depends on a position, orientation, and angle of view A2 of the user U2. In the example illustrated in FIG. 1, the AR objects V1, V2 are placed in positions having different heights within the appearance range E1. Note that the angles of view A1, A2 are, for example, 40 degrees in the horizontal direction and 20 degrees in the vertical direction.

The AR objects V1, V2 move from the positions within the appearance range E1 to, for example, a center of a road in the real space along movement paths R1, R2 and become an AR object V3. The information processing device 200 instructs the mobile terminals 100a, 100b to start a specific scene based on the AR object V3. The mobile terminals 100a, 100b provides, to the users U1, U2, the specific scene based on the AR object V3.

The mobile terminals 100a, 100b, however, are different from each other in position, orientation, and angle of view. This makes the movement path R1 and movement time until the AR object V1 becomes the AR object V3 different from the movement path R2 and movement time until the AR object V2 becomes the AR object V3. Therefore, the AR object V3 is displayed asynchronously on the mobile terminals 100a, 100b, which makes it difficult to provide the specific scene based on the AR object V3 to the users U1, U2 in the same manner.

The mobile terminal 100 and the information processing device 200 according to the present disclosure perform information processing to be described below in order to allow each user to experience the specific scene in the same manner even with a display device having a limited viewing angle. Specifically, each mobile terminal 100 transmits its own position information to the information processing device 200. The position information is calculated in accordance with map matching or the like based on various sensor information acquired by the sensor 110 to be described later. For example, map matching is performed based on an image captured by the mobile terminal 100 using a stereo camera, and the position of the mobile terminal 100 is determined by using a gyroscope sensor or the like, to calculate the position information.

The information processing device 200 determines whether to display the AR objects V1, V2 based on the position information on each of the mobile terminals 100a, 100b thus received. For example, when the users U1, U2 approaches a certain distance (first position) from a specific door where the appearance range E1 is set, the information processing device 200 determines to display the AR objects V1, V2. When determining to display the AR objects V1, V2, the information processing device 200 transmits the display start trigger to the mobile terminals 100a, 100b. The display start trigger includes, for example, the type of the AR object to be displayed (type of character), an appearance position, and a destination position (second position). The destination position is, for example, the position of the AR object V3 described above. Further, the display start trigger may include a time of arrival at the destination position.

Examples of the condition for the determination as to whether to display the AR objects V1, V2 include, in addition to the determination based on the user position described above, a condition where a specific place falls within the angle of view of the user, and a condition where a specific timing comes due to progress of a scenario of the multiplayer game. Examples of the specific timing include a timing when a specific enemy is defeated in the multiplayer game, a timing when a mission is completed, and the like.

The mobile terminals 100a, 100b determine, upon receipt of the display start trigger from the information processing device 200, the types and display positions of the AR objects V1, V2, respectively, based on the display start trigger. First, for the display positions of the AR objects V1, V2, a position-adjustable range is preset in an environment (area) where the game is played. The position-adjustable range is set as a plane or a space. The setting is made using, for example, a shape (plane/sphere/cube or the like), a position (x, y, z), and a size (x, y, z). Herein, the appearance range E1 illustrated in FIG. 1 is set.

The mobile terminals 100a, 100b determines, based on the display start trigger, whether the position, orientation, and angle of view of the user collide with the appearance range E1 that is the set position-adjustable range. The mobile terminals 100a, 100b calculates positions intersecting the respective angles of view A1, A2 of the users U1, U2 within the appearance range E1. The mobile terminals 100a, 100b determine the respective positions thus calculated as the display positions of the AR objects V1, V2. The mobile terminals 100a, 100b respectively display the AR objects V1, V2 in the display positions thus determined. At this time, the AR objects V1, V2 may be different from each other in display timing.

When there is no position intersecting the angles of view A1, A2 of the users U1, U2 within the appearance range E1, the mobile terminals 100a, 100b may repeatedly calculate an intersecting position for a predetermined period of time, for example, about several seconds. In this case, when the user turns his/her face to the appearance range E1 within the predetermined period of time, the display position of the AR object can be determined. On the other hand, when no intersecting position has been found within the predetermined period of time, the collision determination may be terminated, and the AR object may be displayed in a default position. Note that the default position may be, for example, a center of the appearance range E1.

The mobile terminals 100a, 100b move, after displaying the AR objects V1, V2 within the appearance range E1, the AR objects V1, V2 thus displayed to the destination positions, respectively. For example, the mobile terminal 100a moves the AR object V1 to the position of the AR object V3 through the movement path R1. Likewise, for example, the mobile terminal 100b moves the AR object V2 to the position of the AR object V3 through the movement path R2.

At this time, the mobile terminals 100a, 100b each adjust a movement speed and path of a corresponding one of the AR object V1, V2 based on the time of arrival at the destination position included in the display start trigger and move the AR objects V1, V2. Note that, when the display start trigger includes no time of arrival at the destination position, the mobile terminals 100a, 100b each move a corresponding one of the AR objects V1, V2 using a default speed or path. Further, the mobile terminals 100a, 100b may adjust, when moving the AR objects V1, V2 asynchronously, that is, starting animation (moving image) asynchronously, a reproduction speed and number of repetitions of the animation to bring the animation into a synchronized state. Furthermore, in a manner that depends on the length of the time of arrival at the destination position, the animation to be reproduced may be changed to, for example, 5 seconds for the user U1 and 10 seconds for the user U2. The mobile terminals 100a, 100b each transmit, when moving a corresponding one of the AR objects V1, V2 to the position of the AR object V3, notification about completion of movement to the information processing device 200.

The information processing device 200 transmits, upon receipt of the notification about completion of movement from the mobile terminals 100a, 100b, notification about state transition of the AR object to the mobile terminals 100a, 100b. The mobile terminals 100a, 100b start synchronization processing on the AR object V3 based on the notification about state transition thus received.

As described above, the information processing device 200 causes, based on the position information on the mobile terminals 100a, 100b, the AR objects that have been first displayed in positions slightly different depending on gaze points of the users U1, U2 to be displayed in the destination position. This allows, even with a display device having a limited viewing angle, each user to experience a specific scene in the same manner. That is, each user can experience a multiplayer application using the AR technology without missing a necessary scene as much as possible.

1-2. Structure of System According to First Embodiment

Figure 2:
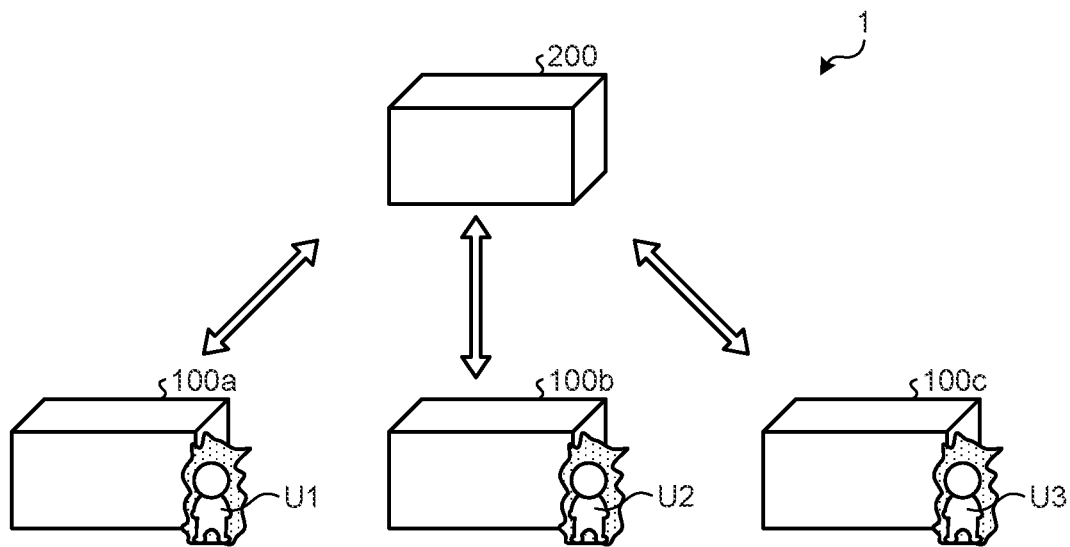
FIG. 2 is a diagram illustrating an example of an information processing system according to the first embodiment.
Figure 3:
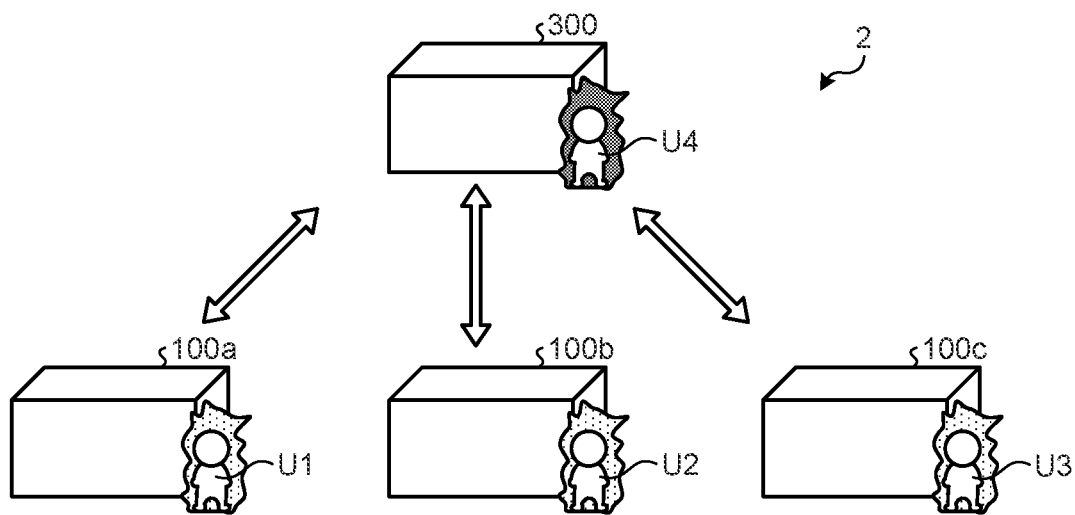
FIG. 3 is a diagram illustrating an example of the information processing system according to the first embodiment.

FIGS. 2 and 3 are diagrams illustrating examples of an information processing system according to the first embodiment. As illustrated in FIG. 2, an information processing system 1 includes a plurality of mobile terminals 100a to 100c and the information processing device 200. The mobile terminals 100a to 100c and the information processing device 200 are connected over, for example, the same network. The mobile terminals 100a to 100c are information processing devices that are worn by users U1 to U3 and with which the users U1 to U3 play a multiplayer game or the like. The information processing device 200 is an information processing device responsible for controlling the progress of the multiplayer game and transmitting a command or data to the mobile terminals 100a to 100c in a manner that depends on the progress of the scenario or the application status. Note that, as with the information processing system 2 illustrated in FIG. 3, a mobile terminal 300 of the user U4 may serve concurrently as the information processing device 200. In this case, the users U1 to U4 are players of the multiplayer game or the like.

1-3. Structure of Mobile Terminal According to First Embodiment

Figure 4:
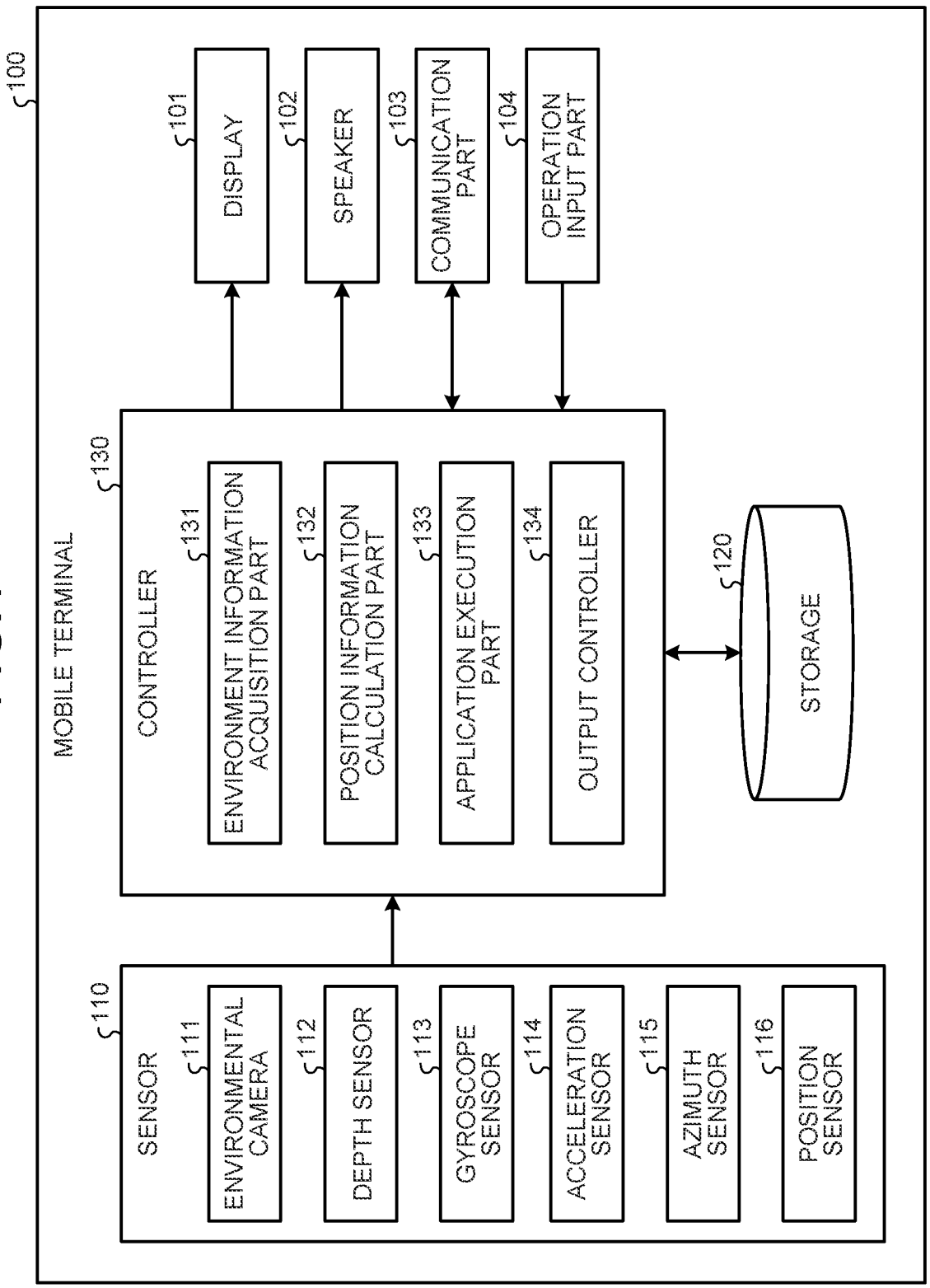
FIG. 4 is a diagram illustrating an example of a structure of a mobile terminal according to the first embodiment.

FIG. 4 is a diagram illustrating an example of a structure of the mobile terminal according to the first embodiment. As illustrated in FIG. 4, the mobile terminal 100 includes the display 101, the speaker 102, a communication part 103, an operation input part 104, the sensor 110, a storage 120, and a controller 130.

The display 101 is, for example, a binocular optical see-through HMD and is positioned on the field of view of the user wearing the mobile terminal 100 to superimpose the AR object on the real space and display the AR object superimposed on the real space. Note that, as the display 101, various HMDs such as a monocular optical see-through HMD, a video see-through HMD, a retinal projection HMD, and an immersive HMD may be used.

Figure 5:
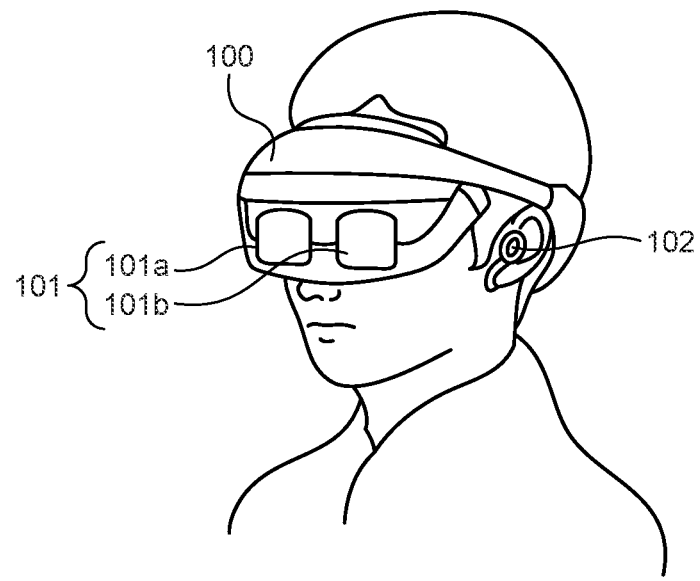
FIG. 5 is a diagram illustrating an example of how the mobile terminal according to the first embodiment is worn.

A description will be given below of an example of how the mobile terminal 100 is worn with reference to FIG. 5. FIG. 5 is a diagram illustrating an example of how the mobile terminal according to the first embodiment is worn. As illustrated in FIG. 5, when the user wears the mobile terminal 100 like glasses, the display 101 is positioned in front of the eyes of the user. The display 101 includes a right-eye display 101a and a left-eye display 101b, and the right-eye display 101a and the left-eye display 101b each display a corresponding image. Further, the speaker 102 may be headphones to be worn on the ears of the user.

Return to the description with reference to FIG. 4. As the speaker 102, dual listening headphones may be used, for example. The speaker 102 enables the user to listen to sound of the multiplayer game and have a conversation with another user at the same time.

The communication part 103 is implemented by a communication module or the like adapted to, for example, a wireless local area network (LAN) such as Wi-Fi (registered trademark). The communication part 103 is a communication interface responsible for controlling communication of information with the information processing device 200. The communication part 103 receives the display start trigger and the notification about state transition from the information processing device 200. The communication part 103 outputs the display start trigger and the notification about state transition thus received to the controller 130. Further, the communication part 103 transmits the position information and the notification about completion of movement input from the controller 130 to the information processing device 200.

The operation input part 104 is, for example, a button that receives user input. The operation input part 104 outputs, to the controller 130, the user input as operation information. Further, the operation input part 104 may support gesture input made by hand recognition using a camera of the sensor 110.

The sensor 110 includes various sensors that capture a scene around the user wearing the mobile terminal 100. The sensor 110 includes an environmental camera 111, a Depth sensor 112, a gyroscope sensor 113, an acceleration sensor 114, an azimuth sensor 115, and a position sensor 116.

The environmental camera 111 is, for example, a monochrome stereo camera, and captures a scene in front of the mobile terminal 100. The environmental camera 111 takes an image using an imaging element such as a complementary metal oxide semiconductor (CMOS) image sensor or a charge coupled device (CCD) image sensor. The environmental camera 111 performs photoelectric-conversion on light received by the imaging element and performs analog/digital (A/D) conversion on a result of the photoelectric-conversion to generate an image. The environmental camera 111 outputs a captured image, which is a stereo image, to the controller 130. The captured image output from the environmental camera 111 is used for self-position estimation using the simultaneous localization and mapping (SLAM) technology. Note that the environmental camera 111 may be a camera equipped with a wide-angle lens or a fisheye lens.

The Depth sensor 112 is, for example, a monochrome stereo camera similar to the environmental camera 111, and captures a scene in front of the mobile terminal 100. The Depth sensor 112 outputs a captured image, which is a stereo image, to the controller 130. The captured image output from the Depth sensor 112 is used for measuring a distance to a subject in a line-of-sight direction of the user. Note that a time of flight (TOF) sensor may be used as the Depth sensor 112.

The gyroscope sensor 113 is a sensor that detects the orientation of the mobile terminal 100, that is, the orientation of the user. For example, a vibration-type gyroscope sensor may be used as the gyroscope sensor 113.

The acceleration sensor 114 is a sensor that detects acceleration in each direction of the mobile terminal 100. As the acceleration sensor 114, for example, a triaxial acceleration sensor such as a piezoresistive acceleration sensor or a capacitive acceleration sensor may be used.

The azimuth sensor 115 is a sensor that detects the azimuth of the mobile terminal 100. For example, a magnetic sensor may be used as the azimuth sensor 115. The gyroscope sensor 113, the acceleration sensor 114, and the azimuth sensor 115 collectively serve as 9 Dof (nine-axis sensor) to output first position information the controller 130.

The position sensor 116 is a sensor that detects the position of the mobile terminal 100, that is, the position of the user. The position sensor 116 is, for example, a global positioning system (GPS) receiver that generates second position information including longitude, latitude, and altitude based on a received GPS signal. The position sensor 116 outputs the second position information thus generated to the controller 16. Note that the second position information is used, for example, for switching maps obtained as a result of dividing each area. When no map switching is required, the position sensor 116 may be removed.

The storage 120 is implemented by a semiconductor memory element such as a random access memory (RAM) or a flash memory, or a storage device such as a hard disk or an optical disc. The storage 120 stores an environment map used for calculating the position of the user. The environment map is, for example, a three-dimensional map using a world coordinate system generated in advance using the SLAM technology. Further, the storage 120 temporarily stores the captured image or the position information acquired from the sensor 110, and stores information (program and data) used for processing in the controller 130.

The controller 130 is implemented by, for example, a central processing unit (CPU), a micro processing unit (MPU), or the like executing a program stored in an internal storage device on a RAM serving as a work area. Alternatively, the controller 130 may be implemented by an integrated circuit such as an application specific integrated circuit (ASIC) or a field programmable gate array (FPGA).

The controller 130 includes an environment information acquisition part 131, a position information calculation part 132, an application execution part 133, and an output controller 134, and implements or executes the function or action of information processing to be described below. Note that the internal structure of the controller 130 is not limited to the structure illustrated in FIG. 4, and may be a different structure as long as the information processing to be described later is performed.

The environment information acquisition part 131 calculates, upon receipt of the captured image, which is a stereo image, input from the Depth sensor 112, a distance (depth) to a subject in the image based on the captured image. The environment information acquisition part 131 generates a distance image including the distance (depth) thus calculated. The environment information acquisition part 131 outputs the distance image thus generated to the application execution part 133. Note that the environment information acquisition part 131 may calculate the distance (depth) to the subject from sensor information based on a method such as motion parallax, TOF, or structured light in addition to the stereo image.

The captured image, which is a stereo image, is input from the environmental camera 111 to the position information calculation part 132. Further, to the position information calculation part 132, the first position information is input from the gyroscope sensor 113, the acceleration sensor 114, and the azimuth sensor 115, and the second position information is input from the position sensor 116. The position information calculation part 132 selects an environment map stored in the storage 120 based on the second position information thus received. The position information calculation part 132 consults the environment map thus selected and performs, based on the input captured image, self-position estimation in accordance with map matching using SLAM. Note that, according to the present embodiment, only a limited number of environment maps is available, so that the position where an environment map is present in the area is estimated in the self-position estimation in accordance with map matching.

The position information calculation part 132 estimates a distance and direction from the position estimated in accordance with map matching based on the input first position information, and calculates position information on the user. The position information on the user includes information on the position of the user in the area and direction information indicating which way the user faces. The position information calculation part 132 transmits the position information on the user thus calculated to the information processing device 200 via the communication part 103. Further, the position information calculation part 132 outputs the calculated position information on the user to the application execution part 133.

The application execution part 133 executes an application such as a multiplayer game. The distance image is input from the environment information acquisition part 131 to the application execution part 133. Further, the position information on the user is input from the position information calculation part 132 to the application execution part 133.

The application execution part 133 outputs, to the output controller 134, data and audio information on the AR object generated based on the command and data such as a scenario received from the information processing device 200, the distance image, and the position information on the user. For example, the application execution part 133 determines, upon receipt of the display start trigger from the information processing device 200, the type and display position of the AR object based on the display start trigger, the distance image, and the position information on the user. The application execution part 133 estimates a distance between the appearance range E1 that is the set position-adjustable range and the user based on the distance image.

The application execution part 133 determines whether the position, orientation, and angle of view the user collide with the appearance range E1 that is the set position-adjustable range. The application execution part 133 calculates a position intersecting the angle of view of the user within the appearance range E1. Note that the angle of view of the user is preset herein. The application execution part 133 determines the position thus calculated as the display position of the AR object. Further, the application execution part 133 determines the size of the AR object based on the estimated distance.

The application execution part 133 moves the AR object from the display position within the appearance range E1 to the destination position. At this time, the application execution part 133 adjusts the movement speed or path of the AR object based on the time of arrival at the destination position and then moves the AR object. The application execution part 133 transmits, after moving the AR object to the destination position, the notification about completion of movement to the information processing device 200 via the communication part 103.

The application execution part 133 starts, upon receipt of the notification about state transition of the AR object from the information processing device 200 via the communication part 103, synchronization processing on the AR object in the destination position based on the notification about state transition thus received.

The output controller 134 displays, upon receipt of the data and audio information on the AR object input from the application execution part 133, the AR object on the display 101 and outputs the audio information to the speaker 102. The output controller 134 displays the data on the AR object input from the application execution part 133 on the display 101 and outputs the audio information to the speaker 102, for example, in a manner that depends on the progress of the scenario or the movement of the AR object based on the display start trigger.

1-4. Structure of Information Processing Device According to First Embodiment

Figure 6:
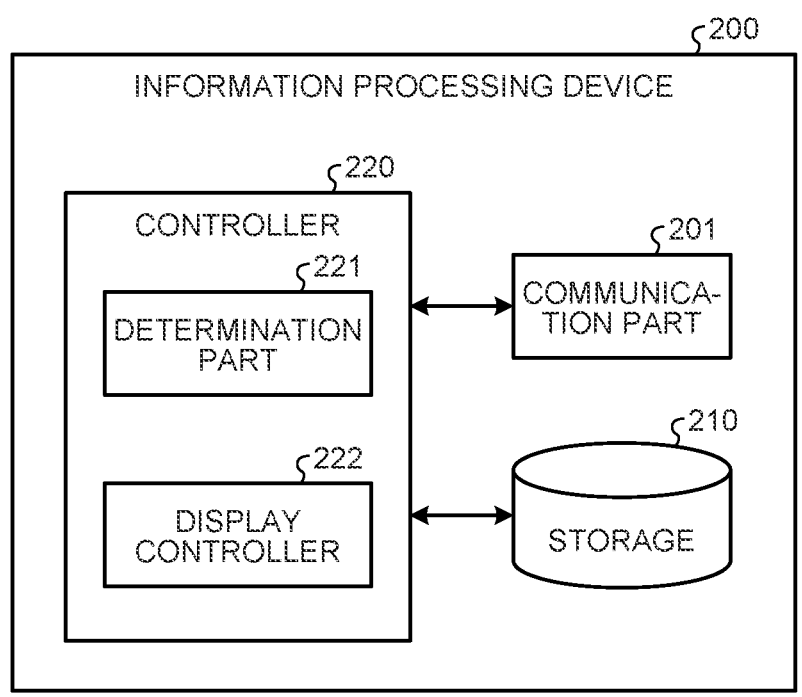
FIG. 6 is a diagram illustrating an example of a structure of an information processing device according to the first embodiment.

Next, a description will be given of a structure of the information processing device 200 with reference to FIG. 6. FIG. 6 is a diagram illustrating an example of the structure of the information processing device according to the first embodiment. As illustrated in FIG. 6, the information processing device 200 includes a communication part 201, a storage 210, and a controller 220.

The communication part 201 is implemented by a communication module or the like adapted to a wireless LAN such as Wi-Fi (registered trademark). The communication part 201 is a communication interface responsible for controlling communication of information with the mobile terminal 100. The communication part 201 receives the position information and the notification about completion of movement from the mobile terminal 100. The communication part 201 outputs the position information and the notification about completion of movement thus received to the controller 220. Further, the communication part 201 transmits, to the mobile terminal 100, the display start trigger and the notification about state transition input from the controller 220.

The storage 210 is implemented by, for example, a semiconductor memory element such as a RAM or a flash memory, or a storage device such as a hard disk or an optical disc. The storage 210 stores the scenario of the multiplayer game or the like, and commands and data adapted to the progress of the scenario or the application status of the mobile terminal 100. Further, the storage 210 stores information (program and data) used for processing in the controller 220.

The controller 220 is implemented by, for example, a CPU, an MPU, or the like executing a program stored in an internal storage device on a RAM serving as a work area. Alternatively, the controller 220 may be implemented by, for example, an integrated circuit such as an ASIC or an FPGA. The controller 220 includes a determination part 221 and a display controller 222, and implements or executes the function or action of information processing to be described below. Note that the internal structure of the controller 220 is not limited to the structure illustrated in FIG. 6, and may be a different structure as long as the information processing to be described later is performed.

The determination part 221 determines, upon receipt of the position information from the mobile terminal 100 via the communication part 201, whether to display the AR object based on the position information thus received. The determination part 221 instructs, when determining to display the AR object, the display controller 222 to generate the display start trigger. The determination part 221 repeats, when determining not to display the AR object, the determination as to whether to display the AR object based on the received position information.

Further, the determination part 221 determines whether the mobile terminal 100b (second mobile terminal) is in the position of the mobile terminal 100a (first mobile terminal) for which the determination as to whether to display the AR object has been made. The determination part 221 instructs, when determining that the mobile terminal 100b is in the position of the mobile terminal 100a, the display controller 222 to generate the display start trigger also for the mobile terminal 100b. That is, the determination part 221 instructs, when determining that a plurality of mobile terminals 100 experience the same event on the scenario, the display controller 222 to generate the display start trigger for each mobile terminal 100. In other words, the determination part 221 starts the motion of the AR object at a different timing for each mobile terminal 100.

The display controller 222 generates, upon receipt of the instruction to generate the display start trigger from the determination part 221, the display start trigger including the type (type of character) of the AR object to be displayed, the appearance position, the destination position, and the time of arrival at the destination position for each mobile terminal 100. The display controller 222 transmits the display start trigger thus generated to the mobile terminal 100 via the communication part 201.

Upon receipt, via the communication part 201, of the notification about completion of movement from all the mobile terminals 100 to which the display start trigger has been transmitted, the display controller 222 transmits the notification about state transition of the AR object to all the mobile terminals 100 from which the notification about completion of movement has been received. The notification about state transition includes, for example, notification about start of synchronization, position, and state of the AR object. That is, in each mobile terminal 100 that has received the notification about state transition, the AR object is displayed in a specific scene with the position, motion, and the like synchronized.

1-5. Information Processing Flow According to First Embodiment

Figure 7:
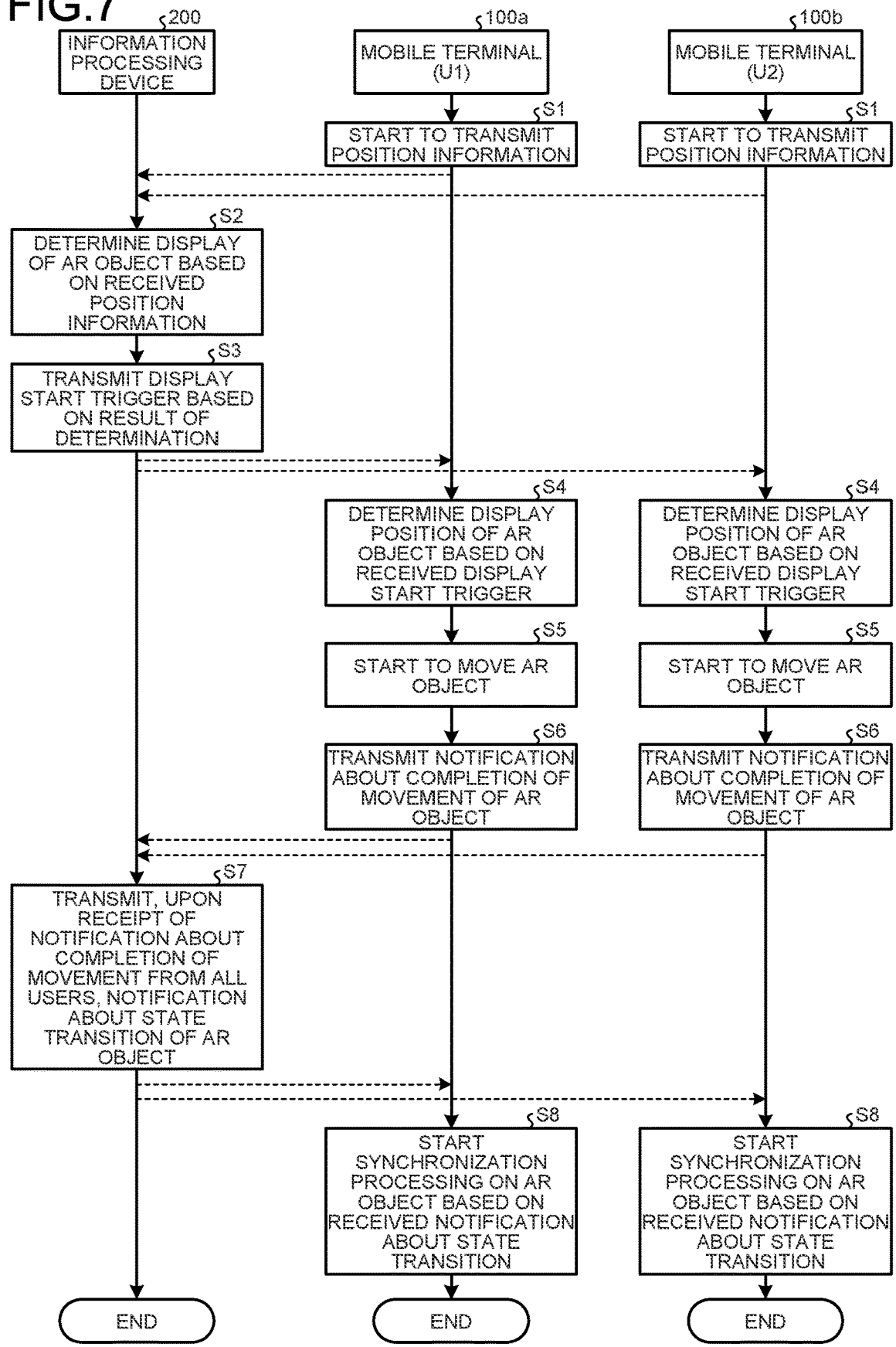
FIG. 7 is a sequence diagram illustrating a processing flow according to the first embodiment.

FIG. 7 is a sequence diagram illustrating a processing flow according to the first embodiment. Note that FIG. 7 illustrates an example of a case where, in the mobile terminals 100a, 100b of the users U1, U2, the AR objects that have started to move asynchronously stops moving at the end point in a synchronized manner, and the next scene is displayed with the AR objects synchronized with each other. Note that since the mobile terminals 100a, 100b operates in the same manner, the mobile terminals 100a, 100b are collectively referred to as the mobile terminal 100 below.

The environment information acquisition part 131 of the mobile terminal 100 generates the distance image based on the captured image input from the Depth sensor 112, and outputs the distance image thus generated to the application execution part 133. Further, the position information calculation part 132 selects an environment map stored in the storage 120 based on the second position information input from the position sensor 116. The position information calculation part 132 consults the environment map thus selected, and performs, based on the captured image input from the environmental camera 111, self-position estimation in accordance with map matching. The position information calculation part 132 estimates a distance and direction from the position estimated in accordance with map matching based on the first position information input from the gyroscope sensor 113, the acceleration sensor 114, and the azimuth sensor 115, and calculates the position information on the user. The position information calculation part 132 starts to transmit the position information on the user thus calculated to the information processing device 200 (step S1). Further, the position information calculation part 132 outputs the calculated position information on the user to the application execution part 133.

The determination part 221 of the information processing device 200 determines, upon receipt of the position information from the mobile terminal 100, whether to display the AR object based on the position information thus received (step S2). The determination part 221 instructs the display controller 222 to generate the display start trigger based on a result of the determination as to whether to display the AR object.

The display controller 222 generates, upon receipt of the instruction to generate the display start trigger from the determination part 221, the display start trigger for each mobile terminal 100. The display controller 222 transmits the display start trigger thus generated to each mobile terminal 100 (step S3).

The application execution part 133 of the mobile terminal 100 determines, upon receipt of the display start trigger from the information processing device 200, the type and display position of the AR object based on the display start trigger, the distance image, and the position information on the user (step S4). The application execution part 133 starts to move the AR object to the destination position (step S5). The application execution part 133 transmits, after moving the AR object to the destination position, the notification about completion of movement to the information processing device 200 (step S6).

Upon receipt of the notification about completion of movement from the mobile terminals 100 of all the users to which the display start trigger has been transmitted, the display controller 222 of the information processing device 200 transmits the notification about state transition of the AR object to the mobile terminals 100 from which the notification about completion of movement has been received (step S7). Note that, for example, upon receipt of the notification about completion of movement from mobile terminals 100 of the majority of users to which the display start trigger has been transmitted, the display controller 222 may transmit the notification about state transition to the mobile terminals 100 to which the display start trigger has been transmitted.

The application execution part 133 of the mobile terminal 100 starts, upon receipt of the notification about state transition of the AR object from the information processing device 200, synchronization processing on the AR object in the destination position based on the notification about state transition thus received (step S8). This allows, even with the mobile terminal 100 that is a display device having a limited viewing angle, each user to experience a specific scene in the same manner.

1-6. Effects

As described above, even with the mobile terminal 100 that is a display device having a limited viewing angle, each user can experience a specific scene in the same manner. That is, each user can experience a multiplayer application using the AR technology without missing a necessary scene as much as possible. This further makes it possible to naturally synchronize and stop, at the destination position, the movements of the AR objects that have started asynchronously between the users. This further allows the AR object to appear in a manner that depends on the current position of each user.

2. Second Embodiment

Meanwhile, according to the first embodiment, a specific object such as a door in the real space is set as the appearance range, but a wider range may be set as the appearance range, and such a case will be described as the second embodiment. Note that, according to the second embodiment, the mobile terminal 100 and the information processing device 200 identical in structure to the mobile terminal 100 and the information processing device 200 according to the first embodiment are used, and thus no description will be given of common structures and operations.

2-1. Example of Appearance Range According to Second Embodiment

Figure 8:
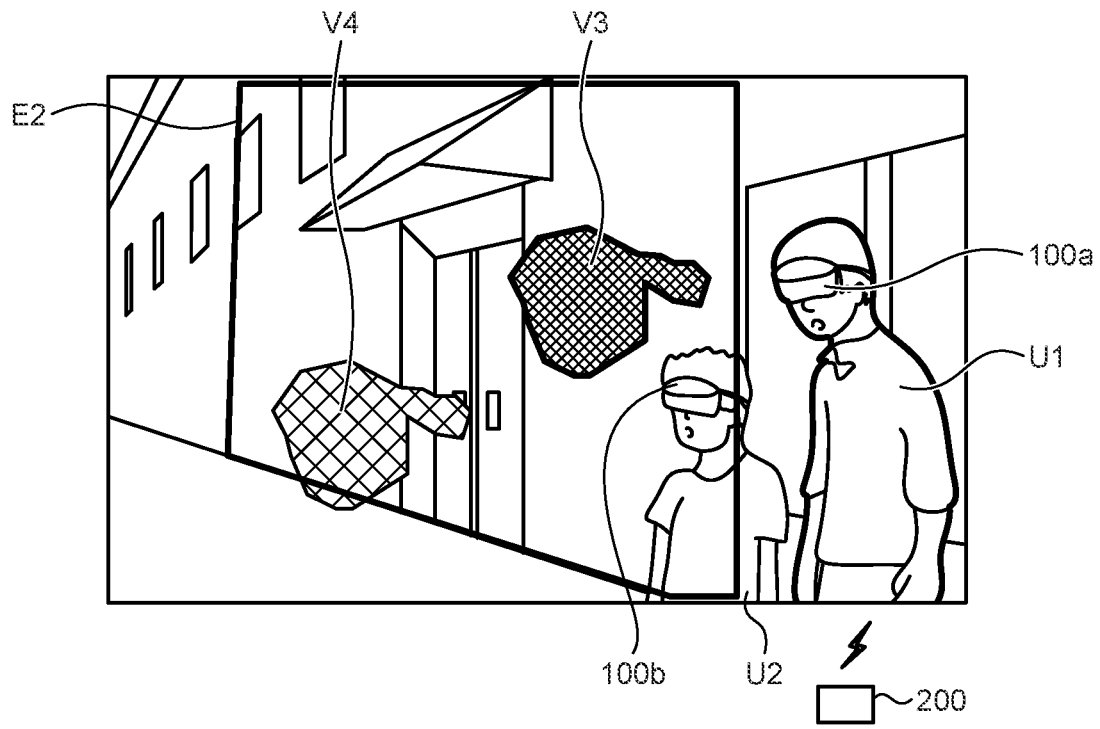
FIG. 8 is a diagram illustrating an example of information processing according to a second embodiment.

FIG. 8 is a diagram illustrating an example of information processing according to the second embodiment. In the example illustrated in FIG. 8, when the users U1, U2 approach a specific place on a road within an area, AR objects V3, V4 appear from an appearance range E2. Note that the AR object V3 is an AR object displayed on the mobile terminal 100*a* of the user U1, and the AR object V4 is an AR object displayed on the mobile terminal 100*b* of the user U2.

The appearance range E2 is set on an entire wall surface of a building corresponding to one block of a street in the real space. In this case, the information processing device 200 adjusts the heights of the AR objects V3, V4, the start timing at which an animation appears, and the time of arrival at the destination position in a manner that depends on positions at which the users U1, U2 look. As described above, the appearance range E2 can have an appearance position adjustable range wider than the appearance range E1 according to the first embodiment. Further, the appearance range may set, for example, on a floor of one block of the street in the real space in a manner that depends on a place or a scenario.

In other words, according to the second embodiment, the plane in the real space on which the appearance range is set is specifically a wall or floor in the real space. The plane in the real space may be regarded as a stationary plane in the real space having at least a certain area that is detected by a sensor including the Depth sensor 112 or the like. The place in the real space is not limited to a smooth plane, that is, a flat plane, and may have irregularities. Alternatively, the plane in the real space may be a curved plane. The plane in the real space according to the second embodiment is an area that is stably detected by the sensor, so that the plane can be suitably used as an area where the AR object is placed.

3. Third Embodiment

Further, when it is desired to make the AR object appear at a specific place, the appearance range may be limited to the specific place, and such a case will be described as the third embodiment. Note that, according to the third embodiment, the mobile terminal 100 and the information processing device 200 identical in structure to the mobile terminal 100 and the information processing device 200 according to the first embodiment are used, and thus no description will be given of common structures and operations.

3-1. Example of Appearance Range According to Third Embodiment

Figure 9:
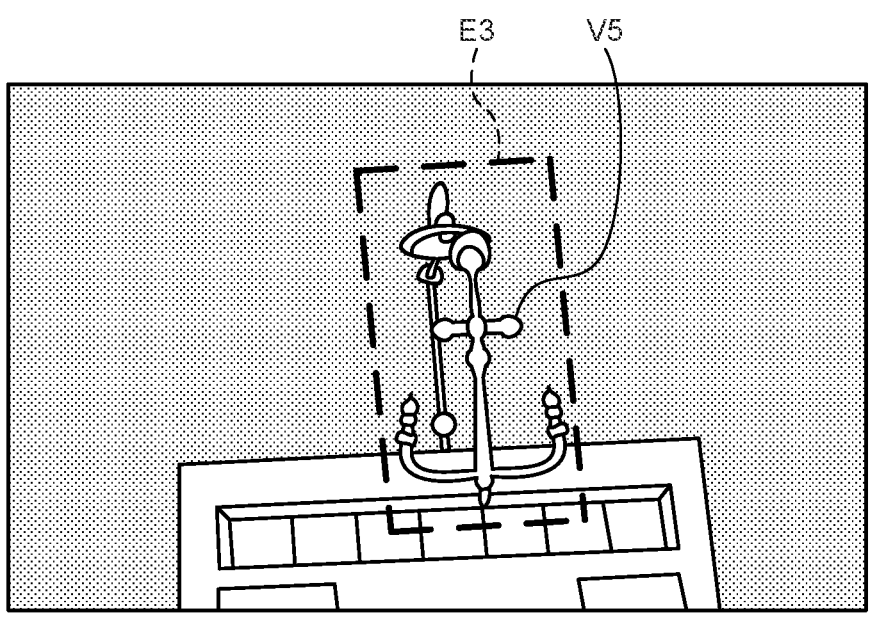
FIG. 9 is a diagram illustrating an example of information processing according to a third embodiment.

FIG. 9 is a diagram illustrating an example of information processing according to the third embodiment. In the example illustrated in FIG. 9, when the user approaches a door of a building, an AR object V5 appears within an appearance range E3 set on a lighting fixture provided above the door. The appearance range E3 is limited to a specific place, that is, the lighting fixture. In this case, the information processing device 200 adjusts the start timing at which an animation appears and the reproduction time of the animation without adjusting the position of the AR object V5. For example, in order to display the AR object V5 on the mobile terminals 100*a*, 100*b* of the users U1, U2, the information processing device 200 starts to make the animation appear when the users U1, U2 each approach a predetermined position relative to the appearance range E3. Subsequently, for example, when the AR object V5 is an enemy in the multiplayer game, and a battle start animation appears, synchronization is started between the mobile terminals 100*a*, 100*b*. As described above, even when the appearance range is limited, the animations that have started asynchronously in a manner that depends on the position of the user can be synchronized at a predetermined timing.

4. Modifications of Embodiments

The processing according to each embodiment described above may be performed in various different modes other than the embodiments described above.

In each embodiment described above, a description has been given of an example where the mobile terminal 100 includes a processor such as the controller 130. The mobile terminal 100 may be divided into, for example, a glasses-type interface part, a computation part including the controller 130, and an operation part that receives an input operation or the like from the user. Further, as described according to each embodiment, the mobile terminal 100 including the display 101 that has transparency and is held in the line-of-sight direction of the user is so-called AR glasses. The mobile terminal 100 may be a device that communicates with the display 101 serving as an external display and performs display control on the display 101. Furthermore, the mobile terminal 100 may be, for example, a smartphone that is held by the user in front of his/her eyes.

In addition, the processing procedure, specific name, and information including various data and parameters illustrated above and in the drawings may be changed as desired unless otherwise specified. For example, the various types of information illustrated in each drawing are not limited to the illustrated information.

Further, each component of each device illustrated in the drawings is functionally conceptual, and is not necessarily physically configured as illustrated in the drawings. That is, a specific form of distribution and integration of each device is not limited to the illustrated form, and all or a part thereof may be functionally or physically distributed and integrated in an arbitrary unit in a manner that depends on various loads, usage conditions, and the like. For example, as with the mobile terminal 300 illustrated in FIG. 3, the functions of the mobile terminal 100 and the information processing device 200 may be integrated.

Further, the above-described embodiments and modifications may be combined as desired to the extent of not making the processing contents inconsistent with each other.

5. Hardware Structure

Figure 10:
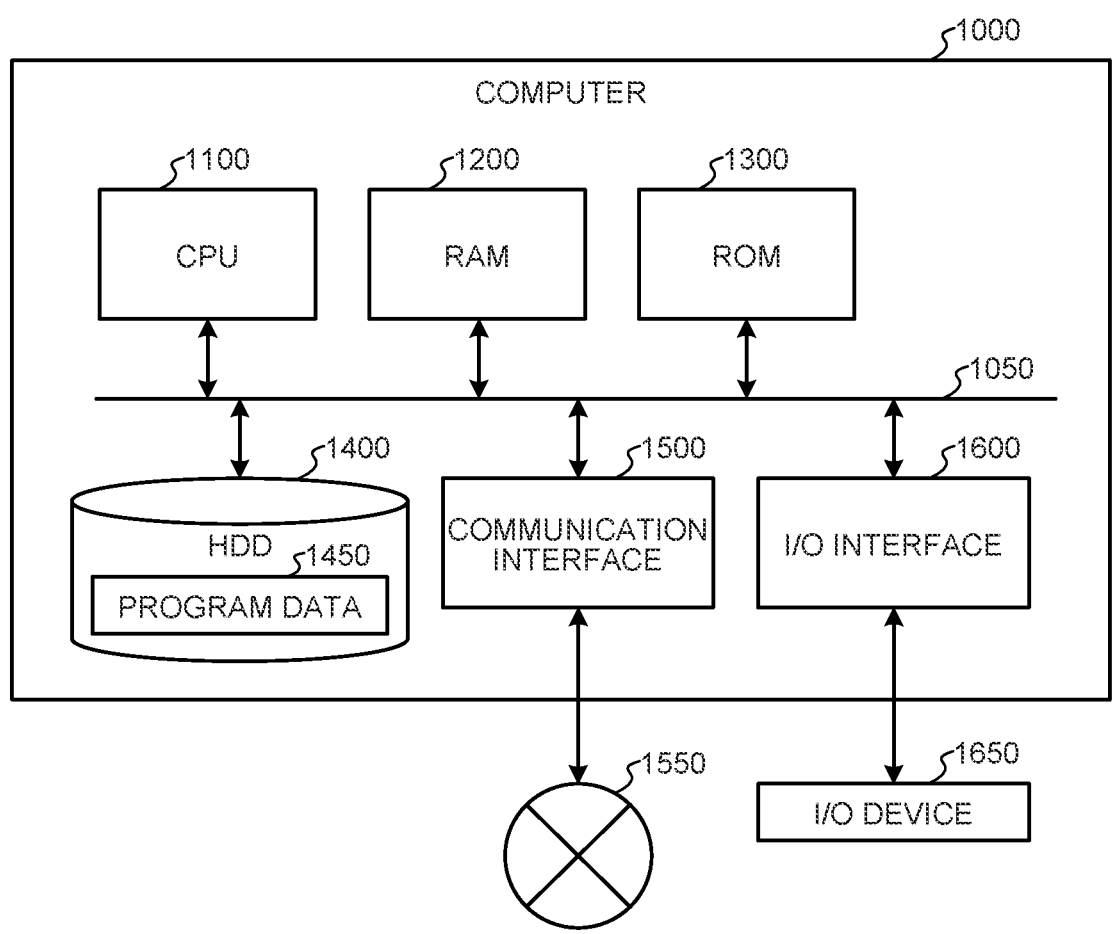
FIG. 10 is a hardware structure diagram illustrating an example of a computer that implements the function of the information processing device.

The information apparatus such as the mobile terminal 100 or the information processing device 200 according to each embodiment described above is implemented by a computer 1000 having a structure as illustrated in FIG. 10, for example. A description will be given below of an example based on the information processing device 200 according to the first embodiment. FIG. 10 is a hardware structure diagram illustrating an example of a computer that implements the function of the information processing device. The computer 1000 includes a CPU 1100, a RAM 1200, a read only memory (ROM) 1300, a hard disk drive (HDD) 1400, a communication interface 1500, and an I/O interface 1600. The components of the computer 1000 are connected over a bus 1050.

The CPU 1100 operates in accordance with a program stored in the ROM 1300 or the HDD 1400 to control each component. For example, the CPU 1100 loads, on the RAM 1200, a program stored in the ROM 1300 or the HDD 1400 and executes processing associated with each of various programs.

The ROM 1300 stores a boot program such as a basic input output system (BIOS) to be executed by the CPU 1100 when the computer 1000 is put into operation, a program adapted to specific hardware of the computer 1000, and the like.

The HDD 1400 is a computer-readable recording medium that records, in a non-transient manner, a program to be executed by the CPU 1100, data to be used by the program, and the like. Specifically, the HDD 1400 is a recording medium that records an information processing program according to the present disclosure, which is an example of program data 1450.

The communication interface 1500 is an interface for the computer 1000 to establish a connection with an external network 1550 (for example, the Internet). For example, the CPU 1100 receives data from another device or transmits data generated by the CPU 1100 to another device via the communication interface 1500.

The I/O interface 1600 is an interface for the computer 1000 to establish a connection with an I/O device 1650. For example, the CPU 1100 receives data from an input device such as a keyboard or a mouse via the I/O interface 1600. Further, the CPU 1100 transmits data to an output device such as a display, a speaker, or a printer via the I/O interface 1600. Further, the I/O interface 1600 may serve as a media interface that reads a program or the like recorded in a predetermined recording medium (medium). Examples of the medium include an optical recording medium such as a digital versatile disc (DVD) or a phase change rewritable disk (PD), a magneto-optical recording medium such as a magneto-optical (MO) disk, a tape medium, a magnetic recording medium, a semiconductor memory, and the like.

For example, when the computer 1000 serves as the information processing device 200 according to the first embodiment, the CPU 1100 of the computer 1000 executes the information processing program loaded on the RAM 1200 to implement the function of the determination part 221 and the like. Further, the HDD 1400 stores the information processing program according to the present disclosure and data in the storage 210. Note that the CPU 1100 reads the program data 1450 from the HDD 1400 and executes the program, or alternatively, as another example, the CPU 1100 may retrieve such programs from another device over the external network 1550.

6. Effects

The information processing device 200 includes a control device (controller 220). The control device determines whether a first mobile terminal (mobile terminal 100a) is in a first position in a real space and causes, based on determination that the first mobile terminal is in the first position, the first mobile terminal to start to superimpose a virtual object on the real space in a manner that depends on the first position, and determines whether a second mobile terminal (mobile terminal 100b) different from the first mobile terminal is in the first position and causes, based on determination that the second mobile terminal is in the first position, the second mobile terminal to start to superimpose the virtual object on the real space. Further, the control device causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

This allows the information processing device 200 to cause each user to experience a specific scene in the same manner even with a display device having a limited viewing angle.

The first motion of the virtual object corresponds to a movement to a second position in the real space different from the first position.

This allows the information processing device 200 to cause each user to experience a multiplayer application using the AR technology without missing a necessary scene as much as possible.

The second motion of the virtual object corresponds to a movement from a display start position different from a display start position of the first motion to the second position.

This allows the information processing device 200 to naturally synchronize and stop, at the destination position, the movements of the virtual objects that have started asynchronously between the users.

The virtual object corresponds to a path in which a movement path corresponding to the first motion and a movement path corresponding to the second motion are different from each other.

This allows the information processing device 200 to cause the virtual object to appear in a manner that depends on the current position of each user.

The control device causes, after the end of the first motion and the second motion, the first mobile terminal and the second mobile terminal to move the virtual object in a synchronized manner.

This allows the information processing device 200 to cause each user to experience a specific scene in the same manner.

The second motion of the virtual object corresponds to reproduction of a moving image different from the first motion in at least one of reproduction speed, number of repetitions, and length.

This allows the information processing device 200 to naturally synchronize and stop, at the destination position, the movements of the virtual objects that have started asynchronously between the users.

The display start position is set on a plane in the real space.

This allows the information processing device 200 to cause the virtual object to appear in a manner that depends on the current position of each user.

The display start position is set within a range corresponding to an object in the real space.

This allows the information processing device 200 to cause the virtual object to appear from an object in the real space in a manner that depends on the current position of each user.

The first motion of the virtual object and the second motion of the virtual object each correspond to display of an image in the display start position.

This allows the information processing device 200 to cause the virtual object whose appearance position is limited to a predetermined position in the real space to appear for each user.

Note that the effects described herein are merely examples and are not restrictively construed, and other effects may be provided.

Note that the present technology may also have the following configuration.

(1) An information processing device comprising a control device configured to determine whether a first mobile terminal is in a first position in a real space and control, based on determination that the first mobile terminal is in the first position, the first mobile terminal to start to superimpose a virtual object on the real space in response to the first position, and determine whether a second mobile terminal different from the first mobile terminal is in the first position and control, based on determination that the second mobile terminal is in the first position, the second mobile terminal to start to superimpose the virtual object on the real space, wherein the control device causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

(2) The information processing device according to (1), wherein the first motion of the virtual object is a movement to a second position in the real space different from the first position.

(3) The information processing device according to (2), wherein the second motion of the virtual object is a movement from a display start position different from a display start position of the first motion to the second position.

(4) The information processing device according to (3), wherein a movement path corresponds to a path in which a movement path corresponding to the first motion and a movement path corresponding to the second motion are paths different from each other.

(5) The information processing device according to (1), wherein the control device causes, after the end of the first motion and the second motion, the first mobile terminal and the second mobile terminal to move the virtual object in a synchronized manner.

(6) The information processing device according to (2), wherein the second motion of the virtual object is reproduction of a moving image different from the first motion in at least one of reproduction speed, number of repetitions, and length.

(7) The information processing device according to (1), wherein the display start position is set on a plane in the real space.

(8) The information processing device according to (1), wherein the display start position is set within a range corresponding to an object in the real space.

(9) The information processing device according to (1), wherein the first motion of the virtual object and the second motion of the virtual object are display of an image in the display start position.

(10) An information processing method comprising causing a control device to perform a process of determining whether a first mobile terminal is in a first position in a real space and controlling, based on determination that the first mobile terminal is in the specific position, the first mobile terminal to start to superimpose a virtual object on the real space in response to the first position, and determining whether a second mobile terminal different from the first mobile terminal is in the first position and controlling, based on determination that the second mobile terminal is in the first position, the second mobile terminal to start to superimpose the virtual object on the real space, wherein the process performed by the control device comprising causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

(11) A recording medium recording an information processing program for causing a control device to perform a process of determining whether a first mobile terminal is in a first position in a real space and controlling, based on determination that the first mobile terminal is in the specific position, the first mobile terminal to start to superimpose a virtual object on the real space in response to the first position, and determining whether a second mobile terminal different from the first mobile terminal is in the first position and controlling, based on determination that the second mobile terminal is in the first position, the second mobile terminal to start to superimpose the virtual object on the real space, wherein the process performed by the control device comprising causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

REFERENCE SIGNS LIST 100, 100a, 100b MOBILE TERMINAL
101 DISPLAY
103 COMMUNICATION PART
110 SENSOR
120 STORAGE
130 CONTROLLER
131 ENVIRONMENT INFORMATION ACQUISITION PART
132 POSITION INFORMATION CALCULATION PART
133 APPLICATION EXECUTION PART
134 OUTPUT CONTROLLER
200 INFORMATION PROCESSING DEVICE
201 COMMUNICATION PART
210 STORAGE
220 CONTROLLER
221 DETERMINATION PART
222 DISPLAY CONTROLLER
A1, A2 ANGLE OF VIEW
E1 to E3 APPEARANCE RANGE
V1 to V5 AR OBJECT
U1 to U4 USER

The invention claimed is:

1. An information processing device comprising a control device configured to
 determine whether a first mobile terminal is in a first position in a real space and
 control, based on determination that the first mobile terminal is in the first position, the first mobile terminal to start to superimpose a virtual object on the real space in response to the first position, and
 determine whether a second mobile terminal different from the first mobile terminal is in the first position and
 control, based on determination that the second mobile terminal is in the first position, the second mobile terminal to start to superimpose the virtual object on the real space, wherein
 the control device
 causes the first mobile terminal to start a first motion of the virtual object and causes the second mobile terminal to start a second motion of the virtual object differently in terms of at least either a display start timing of the virtual object or a display start position of the virtual object, and
 causes the first motion and the second motion to end in a synchronized manner.

2. The information processing device according to claim 1, wherein
 the first motion of the virtual object is a movement to a second position in the real space different from the first position.

3. The information processing device according to claim 2, wherein
 the second motion of the virtual object is a movement from a display start position different from a display start position of the first motion to the second position.

4. The information processing device according to claim 3, wherein
 a movement path corresponds to a path in which a movement path corresponding to the first motion and a movement path corresponding to the second motion are paths different from each other.

5. The information processing device according to claim 1, wherein
 the control device causes, after the end of the first motion and the second motion, the first mobile terminal and the second mobile terminal to move the virtual object in a synchronized manner.

6. The information processing device according to claim 2, wherein
 the second motion of the virtual object is reproduction of a moving image different from the first motion in at least one of reproduction speed, number of repetitions, and length.

7. The information processing device according to claim 1, wherein
 the display start position is set on a plane in the real space.

8. The information processing device according to claim 1, wherein
 the display start position is set within a range corresponding to an object in the real space.

9. The information processing device according to claim 1, wherein
 the first motion of the virtual object and the second motion of the virtual object are display of an image in the display start position.

10. An information processing method comprising causing a control device to perform a process of
 determining whether a first mobile terminal is in a first position in a real space and
 controlling, based on determination that the first mobile terminal is in the first position, the first mobile terminal to start to superimpose a virtual object on the real space in response to the first position, and
 determining whether a second mobile terminal different from the first mobile terminal is in the first position and
 controlling, based on determination that the second mobile terminal is in the first position, the second mobile terminal to start to superimpose the virtual object on the real space, wherein
 the process performed by the control device comprising
 causes the first mobile terminal to start a first motion of the virtual object and causes the second mobile terminal to start a second motion of the virtual object differently in terms of at least either a display start timing of the virtual object or a display start position of the virtual object, and
 causes the first motion and the second motion to end in a synchronized manner.

11. A non-transitory computer-readable recording medium having recorded thereon an information processing program, which when executed by at least one processor causes a control device to perform a process of
 determining whether a first mobile terminal is in a first position in a real space and
 controlling, based on determination that the first mobile terminal is in the first position, the first mobile terminal to start to superimpose a virtual object on the real space in response to the first position, and
 determining whether a second mobile terminal different from the first mobile terminal is in the first position and
 controlling, based on determination that the second mobile terminal is in the first position, the second mobile terminal to start to superimpose the virtual object on the real space, wherein
 the process performed by the control device comprising
 causes the first mobile terminal to start a first motion of the virtual object and causes the second mobile terminal to start a second motion of the virtual object differently in terms of at least either a display start timing of the virtual object or a display start position of the virtual object, and causes the first motion and the second motion to end in a synchronized manner.

* * * * *